(12) United States Patent
Wagner et al.

(10) Patent No.: US 12,049,075 B2
(45) Date of Patent: Jul. 30, 2024

(54) THERMAL TRANSFORMATIVE VARIABLE GLOSS CONTROL

(71) Applicant: Electronics for Imaging, Inc., Fremont, CA (US)

(72) Inventors: Scott J. Wagner, Northfield, NH (US); Donald A. Sloan, Parkville, MO (US)

(73) Assignee: ELECTRONICS FOR IMAGING, INC., Fremont, CA (US)

( * ) Notice: Subject to any disclaimer, the term of this patent is extended or adjusted under 35 U.S.C. 154(b) by 106 days.

(21) Appl. No.: 17/689,080

(22) Filed: Mar. 8, 2022

(65) Prior Publication Data

US 2023/0182487 A1   Jun. 15, 2023

Related U.S. Application Data (60) Provisional application No. 63/288,169, filed on Dec. 10, 2021.

(51) Int. Cl.
| | |
|---|---|
| *B41J 11/00* | (2006.01) |
| *C08F 2/50* | (2006.01) |
| *C09D 11/30* | (2014.01) |

(52) U.S. Cl.
CPC ........... *B41J 11/00212* (2021.01); *B41J 11/00214* (2021.01); *C08F 2/50* (2013.01); *C09D 11/30* (2013.01)

(58) Field of Classification Search
CPC ............ B41J 11/00214; B41J 11/00218; B41J 11/0021; B41J 11/002; B41J 2/01; B41J 3/28; B41M 7/0081; B41M 7/009; B41M 7/00; C09D 11/101; C09D 11/00; C09D 11/30; B05D 5/00; G03G 15/20
See application file for complete search history.

(56) References Cited

U.S. PATENT DOCUMENTS

| | | | |
|---|---|---|---|
| 6,661,993 B2 * | 12/2003 | Bartscher | G03G 15/2064 399/328 |
| 2002/0122106 A1 | 9/2002 | Ylitalo | |
| 2003/0043246 A1 * | 3/2003 | Codos | B41J 2/01 347/102 |
| 2006/0023045 A1 | 2/2006 | Yokoyama et al. | |
| 2008/0192101 A1 | 8/2008 | Hoshino | |
| 2010/0149259 A1 | 6/2010 | Cornell et al. | |
| 2010/0272920 A1 | 10/2010 | Garnett | |
| 2012/0314011 A1 * | 12/2012 | Wetjens | B41J 2/17593 347/102 |
| 2013/0050368 A1 | 2/2013 | Lahut et al. | |
| 2013/0222499 A1 | 8/2013 | Cong et al. | |

(Continued)

FOREIGN PATENT DOCUMENTS

WO      2019116079 A1    6/2019

*Primary Examiner* — John Zimmermann
(74) *Attorney, Agent, or Firm* — Perkins Coie LLP (57) ABSTRACT

Thermal transformative variable gloss control produces selectively variable levels of gloss finish on thermoformed materials. In embodiments, the power level of LED curing lamps associated with an ink jet printer that is using thermoforming inks for printing is selectively varied depending upon a desired level of gloss in a finished substrate. Heat treating of the substrate during thermoforming or in an oven develops the glossy finish on the substrate in relation to the level of power applied to the printer LED curing lamps during printing.

24 Claims, 6 Drawing Sheets

(56) References Cited

U.S. PATENT DOCUMENTS

2013/0271541 A1   10/2013  Ohkawa et al.
2014/0125718 A1    5/2014  Morrision et al.
2018/0001686 A1*  1/2018  Corfe .................... C09D 11/322
2018/0004110 A1*  1/2018  Ron ...................... C09D 11/107

* cited by examiner

THERMAL TRANSFORMATIVE VARIABLE GLOSS CONTROL

CROSS-REFERENCE TO RELATED APPLICATIONS

This application claims priority to U.S. provisional application No. 63/288,169, filed Dec. 10, 2021, which application is incorporated herein in its entirety by this reference thereto.

FIELD

Various of the disclosed embodiments concern a method of producing variable levels of satin or gloss finishes on thermoformed display graphics.

BACKGROUND

Currently, there is no method for controlling gloss on thermoformed display graphics. The gloss level of the finished product is limited to the capabilities of the printer. Currently, there is insignificant change to the finish after thermoforming, the only way to achieve a glossy finish is to print using the second surface method, where the image is printed reversed and is viewed through the clear material, rather than printed on the outward exposed surface, so that the image is displayed from behind the clear media. This limits the gloss finish to the level provided by the media, not the printed image.

SUMMARY

Embodiments of the invention allow printing on the outward surface of thermoforming material. The inventive technique is not restricted to clear material, i.e. it produces a gloss finish on thermoformed materials. Embodiments of the invention also allow variable levels of gloss finish at various locations on the thermoforming material.

In embodiments, the power level of the LED curing lamps associated with an ink jet printer that is using thermoforming inks for printing is selectively varied depending upon a desired level of gloss and the locations of gloss in a finished substrate. The level of gloss is not detectable on the substrate post printing. This is a key reason why gloss control has not been available for thermoformed substrates. However, heat treating of the substrate, for example during thermoforming or in an oven, develops the glossy finish on the substrate in relation to the level of power applied to the printer LED curing lamps during printing.

DETAILED DESCRIPTION

Embodiments of the invention allow printing on the outward surface of thermoforming material that is not restricted to clear material, i.e. to produce a gloss finish on thermoformed materials. Embodiments of the invention also allow selectable variable levels of gloss finish.

The idea of gloss control is not new and can be achieved through other methods on conventional substrates. However, achieving variable levels of gloss on thermoformed images normally requires the application of some sort of spray-on coating or thermoformable laminate. Currently, someone who wanted their thermoformed image to have a higher level of gloss finish would have limited options. One option would be to print their image reversed on a clear sheet of thermoformable material, in a second surface method, which would provide a gloss finish at the level provided by the clear material that the image is displayed behind. Other ways to achieve a gloss finish would be to have some post-production process, either between printing and forming, e.g. applying a laminate or coating, or after thermoforming, e.g. spraying on a coating.

Uniquely, the herein disclosed method for controlling the gloss is achieved using thermoforming inks, such as EFI's TFF inks, combined with the image production using an inkjet printer having an LED UV curing system, followed by a post-production heat or thermoforming process.

In embodiments, the power level of the LED curing lamps associated with an ink jet printer that is using thermoforming inks for printing is selectively varied depending upon a desired level of gloss in a finished substrate. Heat treating of the substrate, for example during thermoforming or in an oven, develops the glossy finish on the substrate in relation to the level of power applied to the printer LED curing lamps during printing.

Although the gloss effect is an automatic feature of the process of printing with an LED curing system and then thermoforming the printed image/substrate, the herein disclosed method controls the amount of gloss. In the state of the art this feature cannot be turned off when using the LED curing system followed by the application of heat, it is an inevitable reaction. The current thermoforming process using mercury arc lamp cured printing prior to thermoforming does not produce these effects, therefore LED curing systems are required to facilitate the process. The gloss level changes from a matte finish after printing, to a higher level of gloss finish after heat has been applied. This effect can be produced with the application of heat alone, without thermoforming the substrate. It is the heat, not the forming, that produces the transformation of the finish from matte to a higher level of gloss.

Figure 1:
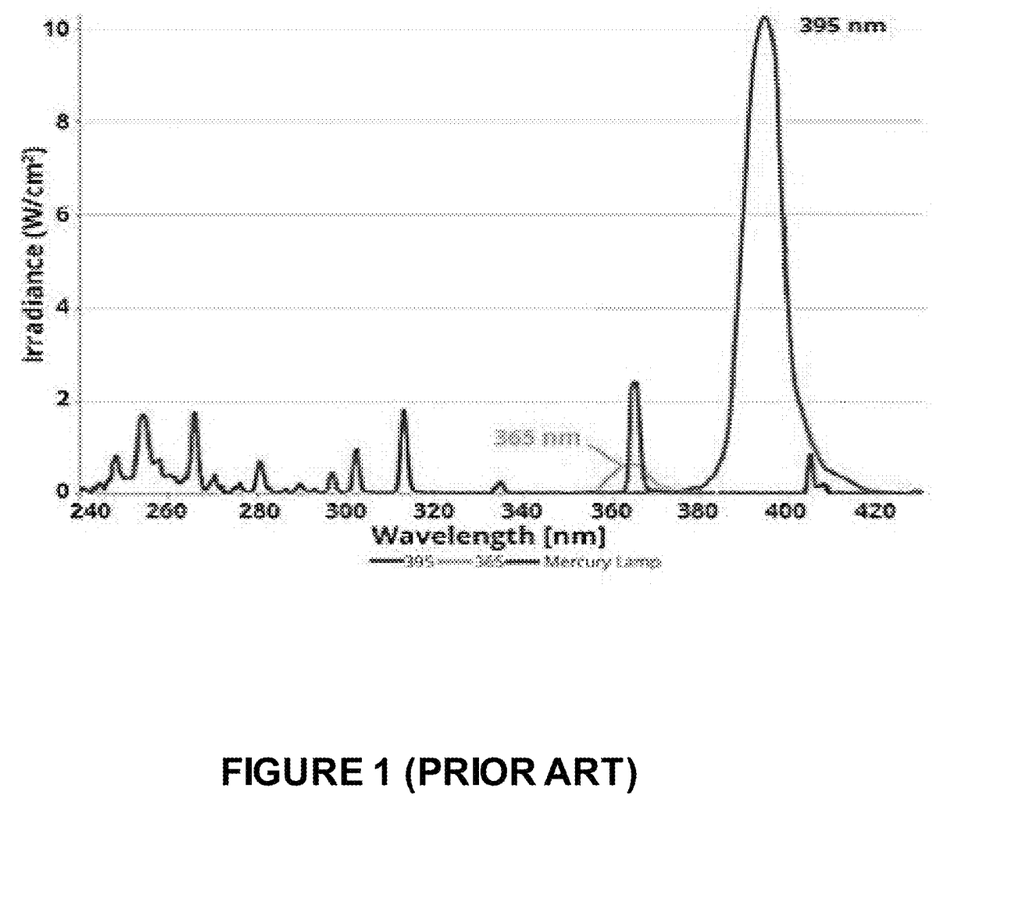
FIG. 1 is a graph showing irradiance of UV/LED lamps versus traditional mercury lamps.

It has been previously described that the gloss of a UV cured print can be controlled by varying the power of segmented LEDs in a hybrid printer (see FIG. 1). However, this technique has only been applied successfully to substrates that have not been subjected to extreme heating where the shape of the substrate was altered significantly, as in thermoforming.

Figure 2:
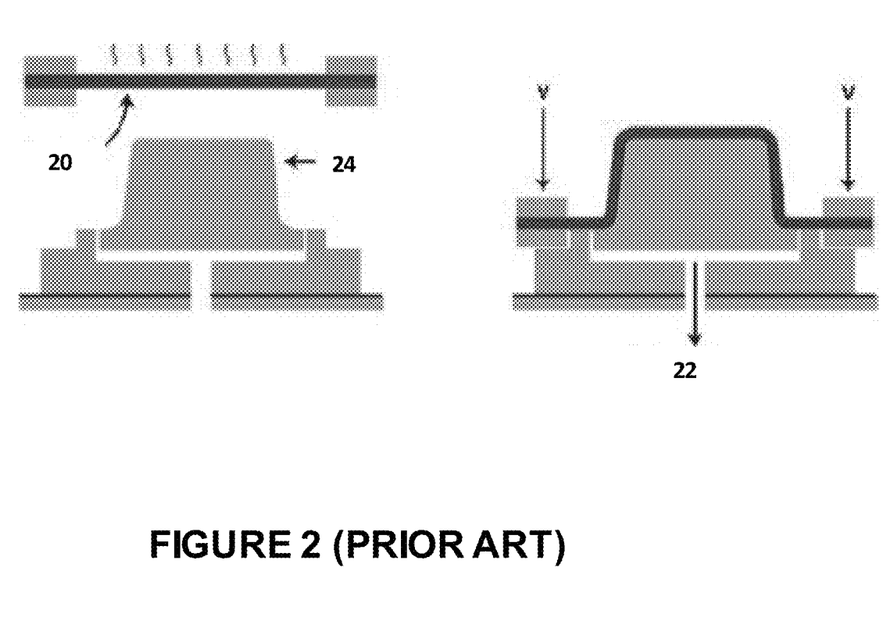
FIG. 2 is a schematic representation of a thermoforming process.

FIG. 2 is a schematic representation of a thermoforming process. In this process, heating is primarily done during thermoforming using heat to soften the media 20 and then applying a vacuum 22 to conform the material around a mold 24 to achieve a three-dimensional object design, although heat may be applied to the substrates in any other fashion, such as in an oven. In thermoforming applications, the heat that is applied to mold the substrate changes the shape of the substrate such that conventional ink jet inks fail to adhere or stretch properly, and this produces unsatisfactory results. To remedy this, thermoforming inks have been developed, such as EFI's TFF inks (see efi.com).

Surprisingly, it has been found that through the adjustment of LED UV lamp curing power on ink jet printers, using TFF inks, a variety of levels of gloss finishes can be achieved after the application of heating and thermoforming the printed image.

Figure 3:
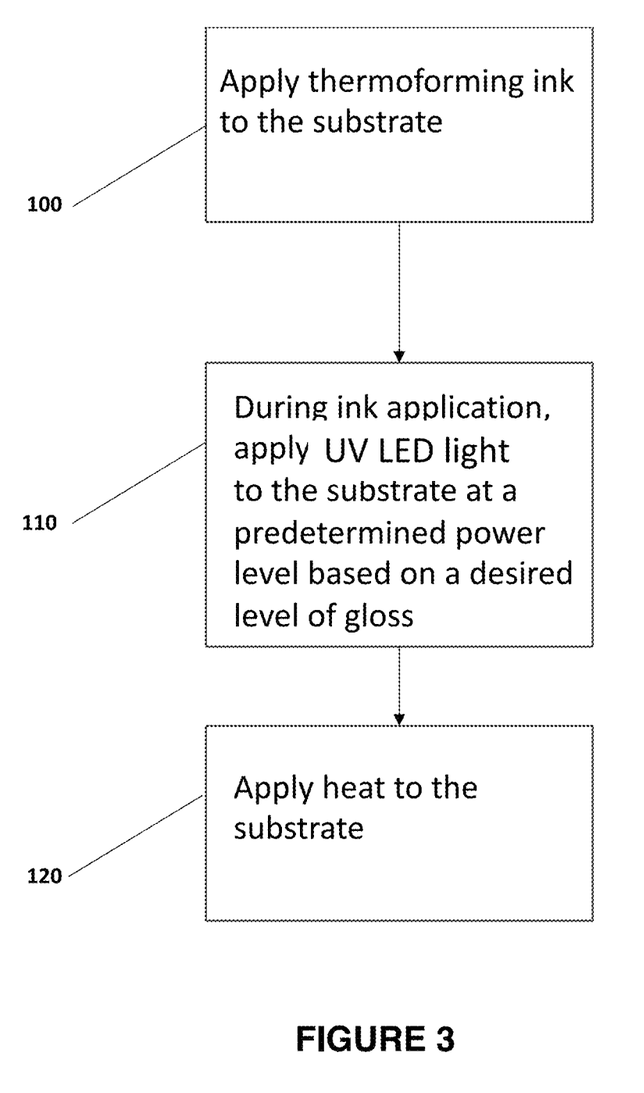
FIG. 3 is a flow diagram showing a method for gloss control on thermoformed substrates.

FIG. 3 is a flow diagram showing a method for gloss control on thermoformed substrates. In FIG. 3, an ink jet printer applies a thermoforming ink to a substrate (100). During ink application, LED curing lamps associated with the printer apply ultra-violet (UV) light to ink on the substrate at varying power levels, where the power level of the applied light determines the degree of gloss in the finished substrate (110). After the substrate is printed, it is subjected to heat to develop the gloss on the surface of the substrate (120). Heat may be applied during a thermoforming process or otherwise.

Figure 4:
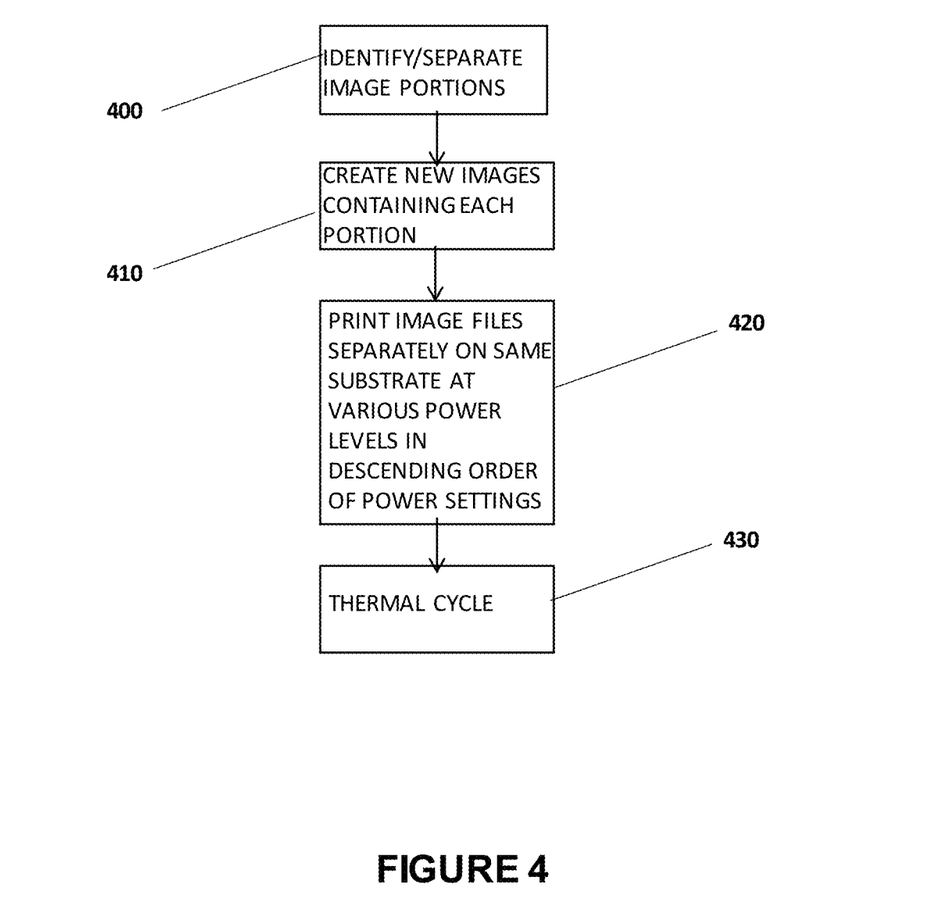
FIG. 4 is a flow diagram showing a method for producing variable spot gloss on thermoformed substrates.

FIG. 4 is a flow diagram showing a method for producing variable spot gloss on thermoformed substrates. The herein disclosed method for producing variable spot gloss in thermoformed samples begins with identifying and separating the different portions of the image that are to exhibit different levels of gloss (400). In embodiments this process of separating these portions of the image can be performed using an application such as Photoshop or a similar program. In other embodiments, the application can comprise an app.

After selecting each portion, new images are created individually containing each separate portion (410) of the original image. The number of different images depends on the number of different levels of gloss finishes that are desired.

These image files are then printed at the various power levels of UV curing, as defined in the gloss control method pertaining to the level of gloss desired for each portion (420). Each image is printed separately on the same substrate, at the desired UV cure setting, starting with the image that needs the highest power UV cure, and continuing to print images in a descending order of UV power settings until the full image has been produced.

The final step is the thermal cycle process (430), usually done during the thermoforming process, which reveals the various gloss levels. Lower power levels of UV ink curing during the printing process yield the lowest levels of gloss finish after the thermoforming process; higher power levels of UV ink curing during printing yield the highest levels of gloss finish after the thermoforming process. These results can also be achieved using a heating method, without the forming process by placing the finished print into an oven or under a sufficient heat source for a predetermined time, such that the finish transforms into its final gloss level.

The level of gloss is not detectable on the substrate post printing. A key reason for this may be that the use of LED lamp curing systems has provided the opportunity to explore this phenomenon. Using conventional mercury arc lamps for ink curing generates a good amount of heat, especially when using the higher power levels. This limits the range of power settings that can be used when printing on many substrates.

Another factor appears to be that the LED wavelength produces a chemical reaction in the inks unlike the reaction from the mercury arc wavelength spectrum, thus enabling the potential for the heat-activated gloss effect. The lower amount of accumulated heat when using LED lamps allows the user to apply the full potential of power settings available, from the lowest to the highest, without much risk of distorting or damaging the substrate. It appears that the herein disclosed gloss effect results from both the ink chemistry and the LED UV wavelength activation of the curing chemistry. These two factors (ink chemistry+LED curing) were not previously available, and the discovery and inventive manipulation of these factors are key to understanding why thermoform gloss control was not previously available.

Inks

The chemistry behind the TFF inks is a very important part of controlling or being able to vary gloss levels while the printed image remains flexible enough for use in thermoforming. To maintain any sort of flexibility which is critical for the thermoforming process the functionality of the inks must be very low in nature. For example, a monomer or oligomer with the functionality of anything greater than two would be much harder and upon forming would exhibit cracking around the formed edges, while a monomer with lower functionality, e.g. between 0-1, would have the required flexibility for the thermoforming process. Examples of monomers that can be used in practicing the invention are monofunctional in nature and are used in percentages ranging from 30-70% in the described ink formulation. The oligomer percentage is typically very low and ranges from 1-6 percent. This is typically due to their inability to thermoform because they typically are higher in functionality than the monofunctional monomers in the formulation.

One other key factor in the formulation is the choice of the photoinitiator package that is used to cure the thermoform ink. A specific blend of photoinitiators is used to achieve the proper amount of surface cure which has a profound effect on the degree of gloss depending on the lamp choice and the printer set up. The peak absorbance range is between 250-400 nanometers of the photoinitiator which correlates to the wavelength of the UV lamps in the printer. A combination of these photoinitiators gives the best results. The combined levels must be kept between 4-12% by weight. In embodiments, the photoinitiators are difunctional alpha-hydroxy ketone that absorb in the 260-nanometer range; a second satisfactory photoinitiator is a bis (2,4,6-trimethylbenzoyl) phosphine oxide that peaks at around 400 nanometers. It is an important part of the formulation to match up the photoinitiator with the type of UV lamps in the printer to achieve the desired cured properties of the ink system. This also helps determine the gloss level of the surface of the ink layer upon the forming process as well as surface hardness and block resistance.

Embodiments of the invention concern thermoforming inks that are used on LED curing printers. In embodiments, the ink set involved may be EFI Transform-TF inks, for example:

45222484 INK EFI TRANSFORM-TF CYAN 2X5L
45222485 INK EFI TRANSFORM-TF MAG 2X5L
45222486 INK EFI TRANSFORM-TF YEL 2X5L
45222487 INK EFI TRANSFORM-TF BLK 2X5L
45222488 INK EFI TRANSFORM-TF LT CYAN 2X5L
45222489 INK EFI TRANSFORM-TF LT MAG 2X5L
45222490 INK EFI TRANSFORM-TF LT YEL 2X5L
45222491 INK EFI TRANSFORM-TF LT BLK 2X5L
45222492 INK EFI TRANSFORM-TF WHT 2X5L

The printer used to develop the method may be, for example any of EFI's GS2000LX, GS3250LX, LX3, PRO 30 F, H3, and H5 printers, but embodiments of the invention are applicable to other thermoforming inks and Inkjet printers that use an LED UV curing system.

Results

Figure 5:
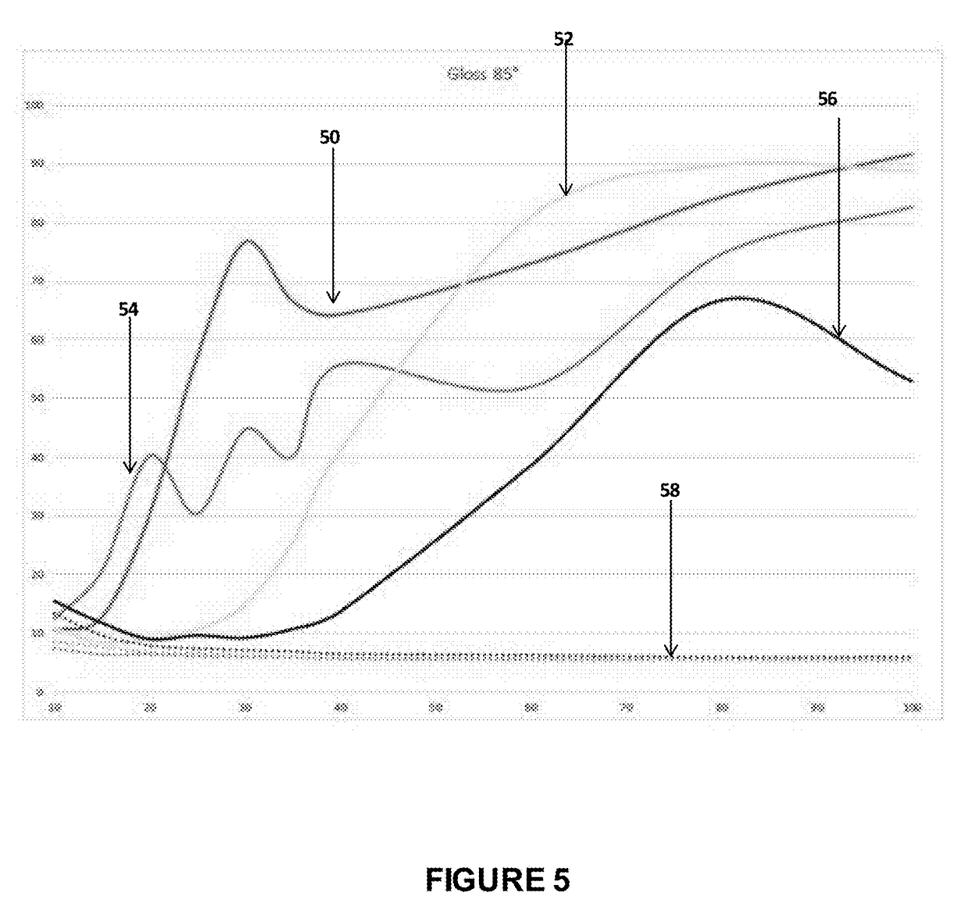
FIG. 5 is a graph showing gloss produced in a substrate after the application of heat thereto when the substrate is exposed to various curing lamp power levels.

FIG. 5 is a graph showing gloss produced in a substrate after the application of heat thereto when the substrate is exposed to various curing lamp power levels. In FIG. 5, a curve is plotted for each of cyan 50, magenta 54, yellow 52, and black inks 56. Gloss is measured with a gloss meter at 85°. Curing lamp power levels are shown along the horizontal axis of the graph and rate of change of gloss is shown along the vertical axis of the graph. The dotted lines at the bottom of the graph show baseline gloss values when no heat is applied to the substrate after printing 58.

Figure 6:
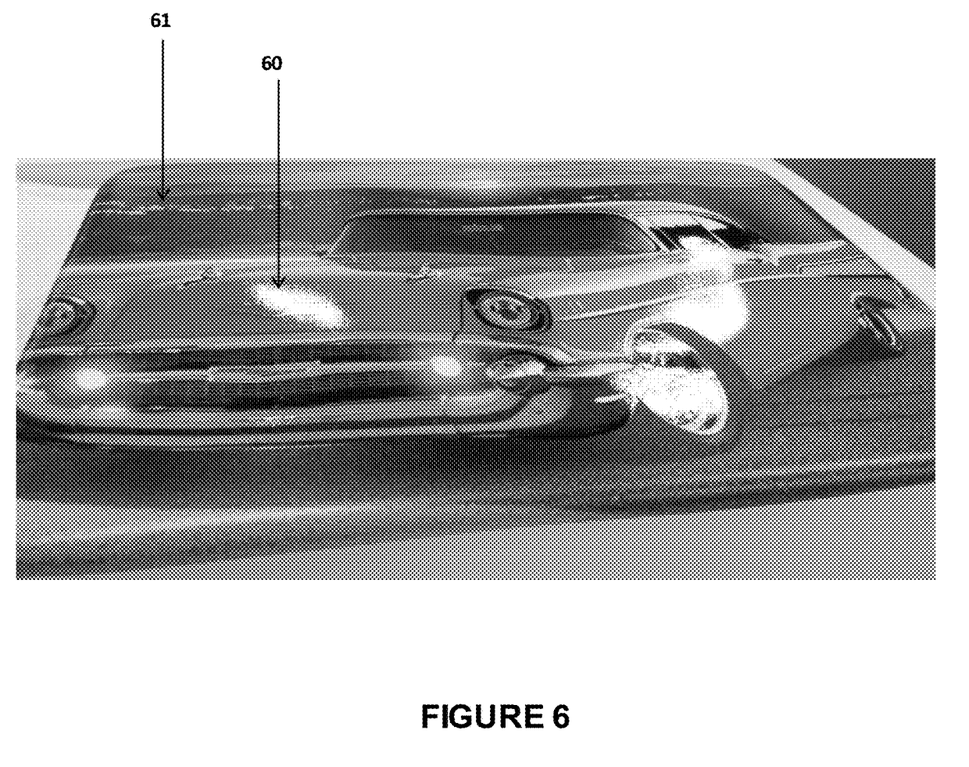
FIG. 6 is a photograph produced by practicing the herein described invention.

FIG. 6 is a photograph produced by practicing the herein described invention, showing an image in which a subject 60, i.e. the automobile, exhibits a high gloss appearance and in which the background 61 exhibits a matte appearance.

Example of tested thermoformed samples:

Using 0.06" polystyrene, the substrate was heated for a little more than two minutes, reaching a temperature of approximately 340° F. At that time, the vacuum forming process was performed, while the substrate was pliable enough to conform and stretch around the mold. The heating time and temperature for thermoforming varies depending on the type of substrate and its thickness.

Table 1 below shows example parameters for controllably achieving a variety of levels of gloss on a finished thermoformed or heat-treated substrate. The substrate was 0.6" white polystyrene. The printer platform that was used in developing this process was EFI's H5 printer printing bidirectionally in an eight-color configuration at 600×1200 dpi resolution, using Phoseon FireJet FJ200 375×20-16 W, +380V lamps. The thermoforming unit used was a Formech 508FS. In alternative embodiments of the invention, an oven heating method could also achieve the gloss results, for example, by maintaining the printed substrates at 60° C. for approximately 24 hours. Oven heating does not necessarily produce equivalent results to thermoforming; temperatures and length of time may vary results.

In Table 1, lamp power levels are shown under the column entitled CURE MODE. A value of 10% Trailing refers operation of the curing lamps at 10% power on the trailing lamp of the print carriage, i.e. on the trailing end of the print carriage's direction of travel. In embodiments, the curing lamps may operate in leading, trailing, or leading and trailing fashion.

As can be seen in Table 1, for a 10% curing lamp power level in a trailing configuration, when gloss is measured with a gloss meter after thermoforming at, for example at an angle of reflective reading of 60° for cyan (C) there is a 64.47368% increase in gloss; with a 35% curing lamp power level in a trailing configuration there is a 1729,825% increase in gloss; and so on as shown.

Values are provided in Table 1 for various powers levels as measured with a gloss meter at both 60° and 85° for each of eight inks in an eight-color plus white printer, where the substrate was heated and formed at −340-350° F. Embodiments of the invention are applicable to any combination and number of inks; measurements may be made at any desired angle.

TABLE 1

Example Gloss Parameters
White Polystyrene 0.06 Thermoforming Gloss Study 600 × 1200 H5 TF-F Ink

| CURE MODE | Before/After | C 60* | C 85* | M 60* | M 85* | Y 60* | Y 85* | K 60* | K 85* |
|---|---|---|---|---|---|---|---|---|---|
| 10% Trailing | Before | 7.6 | 8.5 | 7.2 | 7.4 | 10.4 | 8.9 | 11.1 | 13.4 |
| | After | 12.5 | 12.4 | 11.2 | 10.5 | 13 | 10.8 | 15.1 | 15.5 |
| | % Difference | 64.47368 | 45.88235 | 55.55556 | 41.89189 | 25 | 21.34831 | 36.03604 | 15.67164 |
| 15% Trailing | Before | 7.1 | 7.7 | 6.6 | 6.4 | 9.4 | 7.9 | 8.5 | 9.6 |
| | After | 22.8 | 20.7 | 14.7 | 12.8 | 10.7 | 8.4 | 12.8 | 11.7 |
| | % Difference | 221.1268 | 168.8312 | 122.7273 | 100 | 13.82979 | 6.329114 | 50.58824 | 21.875 |
| 20% Trailing | Before | 6.2 | 6.6 | 6.7 | 6.4 | 8.7 | 7 | 7 | 7.9 |
| | After | 48.4 | 40.3 | 34.3 | 30.2 | 11.5 | 9 | 9.2 | 9 |
| | % Difference | 680.6452 | 510.6061 | 411.9403 | 371.875 | 32.18391 | 28.57143 | 31.42857 | 13.92405 |
| 25% Trailing | Before | 6.2 | 6.6 | 6.8 | 6.1 | 8.5 | 7.2 | 6.4 | 7.4 |
| | After | 56.3 | 30.3 | 71.5 | 57 | 13.7 | 10.6 | 9.6 | 9.6 |
| | % Difference | 808.0645 | 359.0909 | 951.4706 | 834.4262 | 61.17647 | 47.22222 | 50 | 29.72973 |
| 30% Trailing | Before | 6 | 6.4 | 6.6 | 6 | 7.7 | 6.5 | 6.2 | 7.1 |
| | After | 96.7 | 44.7 | 105 | 76.7 | 19.8 | 14.9 | 9.7 | 9.2 |
| | % Difference | 1511.667 | 598.4375 | 1490.909 | 1178.333 | 157.1429 | 129.2308 | 56.45161 | 29.57746 |
| 35% Trailing | Before | 5.7 | 6 | 6.5 | 5.9 | 8.1 | 6.2 | 6 | 6.9 |
| | After | 104.3 | 40.2 | 107 | 66.6 | 30.6 | 25.4 | 11 | 10.7 |
| | % Difference | 1729.825 | 570 | 1546.154 | 1028.814 | 277.7778 | 309.6774 | 83.33333 | 55.07246 |
| Low (40%) Trailing | Before | 5.5 | 5.9 | 6.3 | 5.7 | 7.9 | 6.1 | 6.2 | 6.5 |
| | After | 103.8 | 55.8 | 109 | 64.3 | 47.1 | 41.2 | 14 | 13.7 |
| | % Difference | 1787.273 | 845.7627 | 1630.159 | 1028.07 | 496.2025 | 575.4098 | 125.8065 | 110.7692 |
| Medium (60%) Trailing | Before | 5.4 | 5.9 | 6.4 | 5.5 | 7.2 | 6.1 | 5.5 | 6.3 |
| | After | 102.1 | 52 | 111 | 73 | 100 | 81.1 | 41.8 | 38.6 |
| | % Difference | 1790.741 | 781.3559 | 1634.375 | 1227.273 | 1288.889 | 1229.508 | 660 | 512.6984 |
| High (80%) Trailing | Before | 5.2 | 5.6 | 6.2 | 5.5 | 7.1 | 5.7 | 5.2 | 5.9 |
| | After | 105.4 | 74.6 | 111.7 | 84.4 | 104.7 | 89.8 | 64 | 66.8 |
| | % Difference | 1926.923 | 1232.143 | 1701.613 | 1434.545 | 1374.648 | 1475.439 | 1130.769 | 1032.203 |
| Maximum (100%) Trailing | Before | 5.3 | 5.8 | 6.1 | 5.4 | 7 | 5.8 | 5.3 | 6 |
| | After | 103.5 | 82.7 | 109.2 | 91.7 | 105.9 | 88.9 | 75.6 | 53 |
| | % Difference | 1852.83 | 1325.862 | 1690.164 | 1598.148 | 1412.857 | 1432.759 | 1326.415 | 783.3333 |
| Maximum (100%) Double | Before | 6 | 6.5 | 6.8 | 6.2 | 7.5 | 6.3 | 5.7 | 6.4 |
| | After | 100.5 | 67.2 | 109.2 | 71.5 | 108.2 | 65.2 | 94.6 | 79.6 |
| | % Difference | 1575 | 933.8462 | 1505.882 | 1053.226 | 1342.667 | 934.9206 | 1559.649 | 1143.75 |

TABLE 1-continued

Example Gloss Parameters
White Polystyrene 0.06 Thermoforming Gloss Study 600 × 1200 H5 TF-F Ink

| CURE | Before/ | LC | | LM | | LY | | LK | |
|---|---|---|---|---|---|---|---|---|---|
| MODE | After | 60* | 85* | 60* | 85* | 60* | 85* | 60* | 85* |
| 10% | Before | 7.1 | 8 | 7.3 | 7.5 | 9.2 | 8 | 7.8 | 8.5 |
| Trailing | After | 9.9 | 10.3 | 10.5 | 9.8 | 9.8 | 8.7 | 9.5 | 9.8 |
|  | % Difference | 39.43662 | 28.75 | 43.83562 | 30.66667 | 6.521739 | 8.75 | 21.79487 | 15.29412 |
| 15% | Before | 6.4 | 7.3 | 7 | 7.2 | 8.2 | 7.1 | 6.9 | 7.4 |
| Trailing | After | 11.1 | 11.7 | 12.9 | 12 | 10.4 | 9 | 9.3 | 9.7 |
|  | % Difference | 73.4375 | 60.27397 | 84.28571 | 66.66667 | 26.82927 | 26.76056 | 34.78261 | 31.08108 |
| 20% | Before | 6.2 | 6.9 | 6.8 | 6.6 | 8 | 6.7 | 6.2 | 6.8 |
| Trailing | After | 19.4 | 18.5 | 23.5 | 20.7 | 14.7 | 12.4 | 11.3 | 10.7 |
|  | % Difference | 212.9032 | 168.1159 | 245.5882 | 213.6364 | 83.75 | 85.07463 | 82.25806 | 57.35294 |
| 25% | Before | 6.1 | 6.5 | 6.6 | 6 | 7.5 | 6.4 | 6.1 | 6.7 |
| Trailing | After | 35.3 | 30.8 | 53.7 | 42.5 | 29.5 | 26.6 | 20 | 18.2 |
|  | % Difference | 478.6885 | 373.8462 | 713.6364 | 608.3333 | 293.3333 | 315.625 | 227.8689 | 171.6418 |
| 30% | Before | 5.8 | 6.3 | 6.3 | 5.8 | 7.6 | 6.3 | 5.9 | 6.4 |
| Trailing | After | 48.1 | 30.9 | 95.8 | 68.2 | 63.2 | 51.7 | 42.2 | 40 |
|  | % Difference | 729.3103 | 390.4762 | 1420.635 | 1075.862 | 731.5789 | 720.6349 | 615.2542 | 525 |
| 35% | Before | 5.3 | 5.8 | 6.2 | 5.6 | 7.4 | 6 | 5.6 | 5.9 |
| Trailing | After | 74.5 | 62.5 | 102.4 | 72.4 | 94.5 | 80.2 | 69.3 | 64.5 |
|  | % Difference | 1305.66 | 977.5862 | 1551.613 | 1192.857 | 1177.027 | 1236.667 | 1137.5 | 993.2203 |
| Low | Before | 5.2 | 5.8 | 6 | 5.7 | 7.3 | 5.8 | 5.5 | 5.9 |
| (40%) | After | 52 | 31.2 | 103.8 | 54 | 100 | 77.2 | 93.6 | 80.6 |
| Trailing | % Difference | 900 | 437.931 | 1630 | 847.3684 | 1269.863 | 1231.034 | 1601.818 | 1266.102 |
| Medium | Before | 5.3 | 5.4 | 5.7 | 5.3 | 6.7 | 5.5 | 5.1 | 5.5 |
| (60%) | After | 88.1 | 33.3 | 103.8 | 89.5 | 99.9 | 89.3 | 96.3 | 86.6 |
| Trailing | % Difference | 1562.264 | 516.6667 | 1721.053 | 1588.679 | 1391.045 | 1523.636 | 1788.235 | 1474.545 |
| High | Before | 5.2 | 5.3 | 5.6 | 5.3 | 6.6 | 5.4 | 5 | 5.3 |
| (80%) | After | 100.5 | 71 | 105.1 | 79.6 | 103.7 | 57.9 | 97.8 | 87.4 |
| Trailing | % Difference | 1832.692 | 1239.623 | 1776.786 | 1401.887 | 1471.212 | 972.2222 | 1856 | 1549.057 |
| Maximum | Before | 5 | 5.2 | 5.4 | 5.1 | 6.4 | 5 | 5 | 5.3 |
| (100%) | After | 68.9 | 52.3 | 103.7 | 81.8 | 99.6 | 94.4 | 95.4 | 67 |
| Trailing | % Difference | 1278 | 905.7692 | 1820.37 | 1503.922 | 1456.25 | 1788 | 1808 | 1164.151 |
| Maximum | Before | 5.5 | 5.6 | 6 | 5.8 | 6.8 | 5.5 | 5.3 | 5.7 |
| (100%) | After | 99.3 | 60.4 | 103.8 | 66.7 | 101.5 | 84.9 | 97.7 | 97.2 |
| Double | % Difference | 1705.455 | 978.5714 | 1630 | 1050 | 1392.647 | 1443.636 | 1743.396 | 1605.263 |

| CURE | Before/ | R | | G | | B | | W | |
|---|---|---|---|---|---|---|---|---|---|
| MODE | After | 60* | 85* | 60* | 85* | 60* | 85* | 60* | 85* |
| 10% | Before | 13 | 12.9 | 13.2 | 14.3 | 8.6 | 8.8 | 11.1 | 8.5 |
| Trailing | After | 15.4 | 13.5 | 15 | 14 | 12 | 10.3 | 14.1 | 11.8 |
|  | % Difference | 18.46154 | 4.651163 | 13.63636 | −2.0979 | 39.53488 | 17.04545 | 27.02703 | 38.82353 |
| 15% | Before | 9.9 | 9.6 | 10 | 10.4 | 7.1 | 7.2 | 9.6 | 7.2 |
| Trailing | After | 13.1 | 10.9 | 13.3 | 12.2 | 10.3 | 9.6 | 13.7 | 11 |
|  | % Difference | 32.32323 | 13.54167 | 33 | 17.30769 | 45.07042 | 33.33333 | 42.70833 | 52.77778 |
| 20% | Before | 8.6 | 8.3 | 8.5 | 9 | 6.7 | 6.7 | 9.1 | 6.4 |
| Trailing | After | 12.2 | 10.6 | 13.3 | 12.6 | 17.5 | 16.3 | 15.5 | 12.2 |
|  | % Difference | 41.86047 | 27.71084 | 56.47059 | 40 | 161.194 | 143.2836 | 70.32967 | 90.625 |
| 25% | Before | 8.3 | 7.8 | 8 | 8 | 6.1 | 6 | 8.3 | 5.7 |
| Trailing | After | 13 | 9.9 | 16.9 | 14.9 | 34 | 29.3 | 17.1 | 13.2 |
|  | % Difference | 56.62651 | 26.92308 | 111.25 | 86.25 | 457.377 | 388.3333 | 106.0241 | 131.5789 |
| 30% | Before | 7.9 | 7.2 | 7.2 | 7.3 | 6.1 | 5.8 | 7.8 | 5.1 |
| Trailing | After | 18.5 | 14 | 23.2 | 20.7 | 74.8 | 50.9 | 23 | 17.4 |
|  | % Difference | 134.1772 | 94.44444 | 222.2222 | 183.5616 | 1126.23 | 777.5862 | 194.8718 | 241.1765 |
| 35% | Before | 7.2 | 6.7 | 6.8 | 6.7 | 6.1 | 5.9 | 7.5 | 4.9 |
| Trailing | After | 26 | 19.4 | 32.9 | 25.6 | 90.8 | 58.3 | 26 | 20.6 |
|  | % Difference | 261.1111 | 189.5522 | 383.8235 | 282.0896 | 1388.525 | 888.1356 | 246.6667 | 320.4082 |
| Low | Before | 6.8 | 6.4 | 6.7 | 6.4 | 5.9 | 5.6 | 7.6 | 4.7 |
| (40%) | After | 37.5 | 25.4 | 46.2 | 36.2 | 102.9 | 57.8 | 28.1 | 23 |
| Trailing | % Difference | 451.4706 | 296.875 | 589.5522 | 465.625 | 1644.068 | 932.1429 | 269.7368 | 389.3617 |
| Medium | Before | 6.8 | 6.1 | 6.8 | 6.4 | 5.9 | 5.6 | 7.6 | 4.5 |
| (60%) | After | 92.8 | 42.2 | 96.8 | 67.9 | 105.9 | 54.4 | 49.2 | 41.1 |
| Trailing | % Difference | 1264.706 | 591.8033 | 1323.529 | 960.9375 | 1694.915 | 871.4286 | 547.3684 | 813.3333 |
| High | Before | 6.9 | 6 | 6.6 | 6.5 | 5.9 | 5.3 | 7.4 | 4.7 |
| (80%) | After | 100.6 | 58 | 101.8 | 44.6 | 107.7 | 80.1 | 83.3 | 71.8 |
| Trailing | % Difference | 1357.971 | 866.6667 | 1442.424 | 586.1538 | 1725.424 | 1411.321 | 1025.676 | 1427.66 |
| Maximum | Before | 6.9 | 6 | 7 | 6.4 | 6 | 5.4 | 7.5 | 4.7 |
| (100%) | After | 104.3 | 61.6 | 102.1 | 75.2 | 106 | 48.8 | 90.4 | 59.3 |
| Trailing | % Difference | 1411.594 | 926.6667 | 1358.571 | 1075 | 1666.667 | 803.7037 | 1105.333 | 1161.702 |
| Maximum | Before | 6.9 | 6.2 | 6.7 | 6.6 | 6.1 | 5.7 | 7.9 | 4.8 |
| (100%) | After | 94.4 | 55.5 | 105 | 38.7 | 101.6 | 45.8 | 77.9 | 76.3 |
| Double | % Difference | 1268.116 | 795.1613 | 1467.164 | 486.3636 | 1565.574 | 703.5088 | 886.0759 | 1489.583 |

The language used in the specification has been principally selected for readability and instructional purposes. It may not have been selected to delineate or circumscribe the subject matter. It is therefore intended that the scope of the technology be limited not by this Detailed Description, but rather by any claims that issue on an application based hereon. Accordingly, the disclosure of various embodiments is intended to be illustrative, but not limiting, of the scope of the technology as set forth in the following claims.

The invention claimed is:

1. A method for gloss control of thermoformed substrates, comprising;
   applying thermoform ink to a substrate with an ink jet printer to produce an image on the substrate;
   during ink application, applying ultra-violet (UV) light with LED curing lamps associated with the printer to ink on the substrate at varying power levels, wherein the applied light power level determines a degree of gloss in a finished substrate; and
   after said substrate is printed, subjecting the substrate to heat to develop gloss on the substrate surface.

2. The method of claim 1, further comprising:
   identifying and separating different portions of the image that are to exhibit different levels of gloss;
   after selecting each portion, creating new image files, each file individually containing each different portion of the image, wherein several different images depends on a number of different levels of gloss finishes that are desired;
   printing each image file separately on the same substrate at a selected power level of UV light corresponding to desired gloss levels, starting with an image that needs a highest power levels of UV light, and continuing to print images in a descending order of power levels of UV light until the full image has been produced.

3. The method of claim 2, wherein lower power levels of UV light during printing yield lower levels of gloss finish after application of heat to the substrate and higher power levels of UV light during printing yield higher levels of gloss finish after application of heat to the substrate.

4. The method of claim 1, further comprising:
   subjecting the substrate to heat as part of a thermoforming process.

5. The method of claim 1, further comprising:
   subjecting the substrate to heat by placing the printed substrate into an oven for a predetermined time.

6. The method of claim 1, further comprising:
   using a thermoform ink comprising:
      a monomer or oligomer having a functionality between 0-1.

7. The method of claim 6, wherein said monomer comprises a monofunctional monomer comprising 30-70% by weight of said ink formulation.

8. The method of claim 6, wherein said oligomer comprises 1-6% by weight of said ink.

9. The method of claim 1, further comprising:
   using a thermoform ink comprising:
      a photoinitiator having a peak absorbance range of 250-400 nanometers.

10. The method of claim 9, further comprising:
    using a combination of photoinitiators having combined levels of 4-12% by weight of said ink formation.

11. The method of claim 10, wherein said photoinitiators comprise any of a difunctional alpha-hydroxy ketone that absorbs in the 260-nanometer range and a bis (2,4,6-trimethylbenzoyl) phosphine oxide having peak absorption at about 400 nanometers.

12. The method of claim 9, wherein an absorption range of said photoinitiator substantially matches a range of the UV light in the printer.

13. An ink jet printer, comprising;
    a print engine for applying thermoforming ink to a substrate to produce an image on the substrate;
    a plurality of LED curing lamps associated with an ink jet printer for applying ultra-violet (UV) light to ink on the substrate at varying power levels during ink application, wherein the applied light power level determines a degree of gloss in a finished substrate; and
    a heat source for subjecting the substrate to heat to develop gloss on the substrate surface after said substrate is printed.

14. The ink jet printer of claim 13, further comprising:
    an application for identifying and separating different portions of the image that are to exhibit different levels of gloss;
    wherein, after selecting each portion, said application creates new image files, each file individually containing each different portion of the image, wherein several different images depends on a number of different levels of gloss finishes that are desired;
    wherein said print engine prints each image file separately on the same substrate at a selected power level of UV light corresponding to desired gloss levels, starting with an image that needs a highest power levels of UV light, and continuing to print images in a descending order of power levels of UV light until the full image has been produced.

15. The ink jet printer of claim 14, wherein lower power levels of UV light during printing yield lower levels of gloss finish after application of heat to the substrate and higher power levels of UV light during printing yield higher levels of gloss finish after application of heat to the substrate.

16. The ink jet printer of claim 13, further comprising:
    a thermoforming mechanism with which said substrate is subjected to heat as part of a thermoforming process.

17. The ink jet printer of claim 13, further comprising:
    an oven in which the printed substrate is placed for a predetermined time to subject said substrate to heat.

18. The ink jet printer of claim 13, said thermoform ink comprising:
    a monomer or oligomer having a functionality between 0-1.

19. The ink jet printer of claim 18, wherein said monomer comprises a monofunctional monomer comprising 30-70% by weight of said ink formulation.

20. The ink jet printer of claim 18, wherein said oligomer comprises 1-6% by weight of said ink.

21. The ink jet printer of claim 13, said thermoform ink comprising:
    a photoinitiator having a peak absorbance range of 250-400 nanometers.

22. The ink jet printer of claim 21, said thermoform ink comprising:
    a combination of photoinitiators having combined levels of 4-12% by weight of said ink formation.

23. The ink jet printer of claim 22, wherein said photoinitiators comprise any of a difunctional alpha-hydroxy ketone that absorbs in the 260-nanometer range and a bis (2,4,6-trimethylbenzoyl) phosphine oxide having peak absorption at about 400 nanometers.

24. The ink jet printer of claim 21, wherein an absorption range of said photoinitiator substantially matches a range of the UV light in the printer.

* * * * *

UNITED STATES PATENT AND TRADEMARK OFFICE
CERTIFICATE OF CORRECTION

| | |
|---|---|
| PATENT NO. | : 12,049,075 B2 |
| APPLICATION NO. | : 17/689080 |
| DATED | : July 30, 2024 |
| INVENTOR(S) | : Scott J. Wagner and Donald A. Sloan |

It is certified that error appears in the above-identified patent and that said Letters Patent is hereby corrected as shown below:

In the Claims

In Claim 1, Column 9, Line 12, remove ";" and add a ":" after "comprising".

In Claim 1, Column 9, Line 13, add a "-" between "ink jet".

In Claim 2, Column 9, Line 27, change "depends" to "depend".

In Claim 13, Column 10, Line 4, add a "-" between "ink jet".

In Claim 13, Column 10, Line 4, add a ":" after "comprising" and delete ";".

In Claim 14, Column 10, Line 14, add a "-" between "ink jet".

In Claim 14, Column 10, Line 22, change "depends" to "depend".

In Claim 15, Column 10, Line 31, add a "-" between "ink jet".

In Claim 16, Column 10, Line 36, add a "-" between "ink jet".

In Claim 17, Column 10, Line 39, add a "-" between "ink jet".

In Claim 18, Column 10, Line 42, add a "-" between "ink jet".

In Claim 19, Column 10, Line 46, add a "-" between "ink jet".

In Claim 20, Column 10, Line 49, add a "-" between "ink jet".

In Claim 21, Column 10, Line 51, add a "-" between "ink jet".

Signed and Sealed this
Fifteenth Day of October, 2024

Katherine Kelly Vidal
*Director of the United States Patent and Trademark Office*

In Claim 22, Column 10, Line 55, add a "-" between "ink jet".

In Claim 23, Column 10, Line 59, add a "-" between "ink jet".

In Claim 24, Column 10, Line 64, add a "-" between "ink jet".